United States Patent [19]

Cooper et al.

[11] 4,447,121
[45] May 8, 1984

[54] CONNECTOR FOR FIBER OPTIC MEMBER

[75] Inventors: Ronald F. Cooper, Orrtanna; Erlon F. Johnson, Elizabethtown, both of Pa.

[73] Assignee: AMP Incorporated, Harrisburg, Pa.

[21] Appl. No.: 319,025

[22] Filed: Nov. 6, 1981

[51] Int. Cl.³ .............................................. G02B 7/26
[52] U.S. Cl. ............................... 350/96.20; 350/96.21
[58] Field of Search ............... 350/96.20, 96.21, 96.22

[56] References Cited

U.S. PATENT DOCUMENTS

| | | | |
|---|---|---|---|
| 3,995,938 | 12/1976 | McCartney | 350/96 C |
| 4,101,198 | 7/1978 | Heldt | 350/96.20 |
| 4,198,119 | 4/1980 | Uberbacher | 350/96.20 |
| 4,273,413 | 6/1981 | Bendiksen et al. | 350/96.20 |
| 4,290,668 | 9/1981 | Ellis et al. | 350/96.20 |
| 4,336,977 | 6/1982 | Monaghan et al. | 350/96.20 |
| 4,355,862 | 10/1982 | Kock | 350/96.20 |
| 4,368,948 | 1/1983 | Despouys | 350/96.20 |

FOREIGN PATENT DOCUMENTS 2069170 8/1981 United Kingdom ............. 350/96.20

Primary Examiner—John D. Lee
Assistant Examiner—Frank González
Attorney, Agent, or Firm—Adrian J. LaRue; Anton P. Ness

[57] ABSTRACT

A connector for a fiber optic member comprises a ferrule in which is positioned an insert surrounding a section of the fiber optic member adjacent an exposed end of the fiber optic member, the exposed end extending along a front bore of the ferrule. A crimping ring on the ferrule is controllably crimped thereon thereby moving arcuate sections of the insert into mechanical engagement with the fiber optic member with no or minimum deformation to the fiber optic member and securing the fiber optic member in the ferrule. A single crimping ferrule can be used if desired.

20 Claims, 6 Drawing Figures

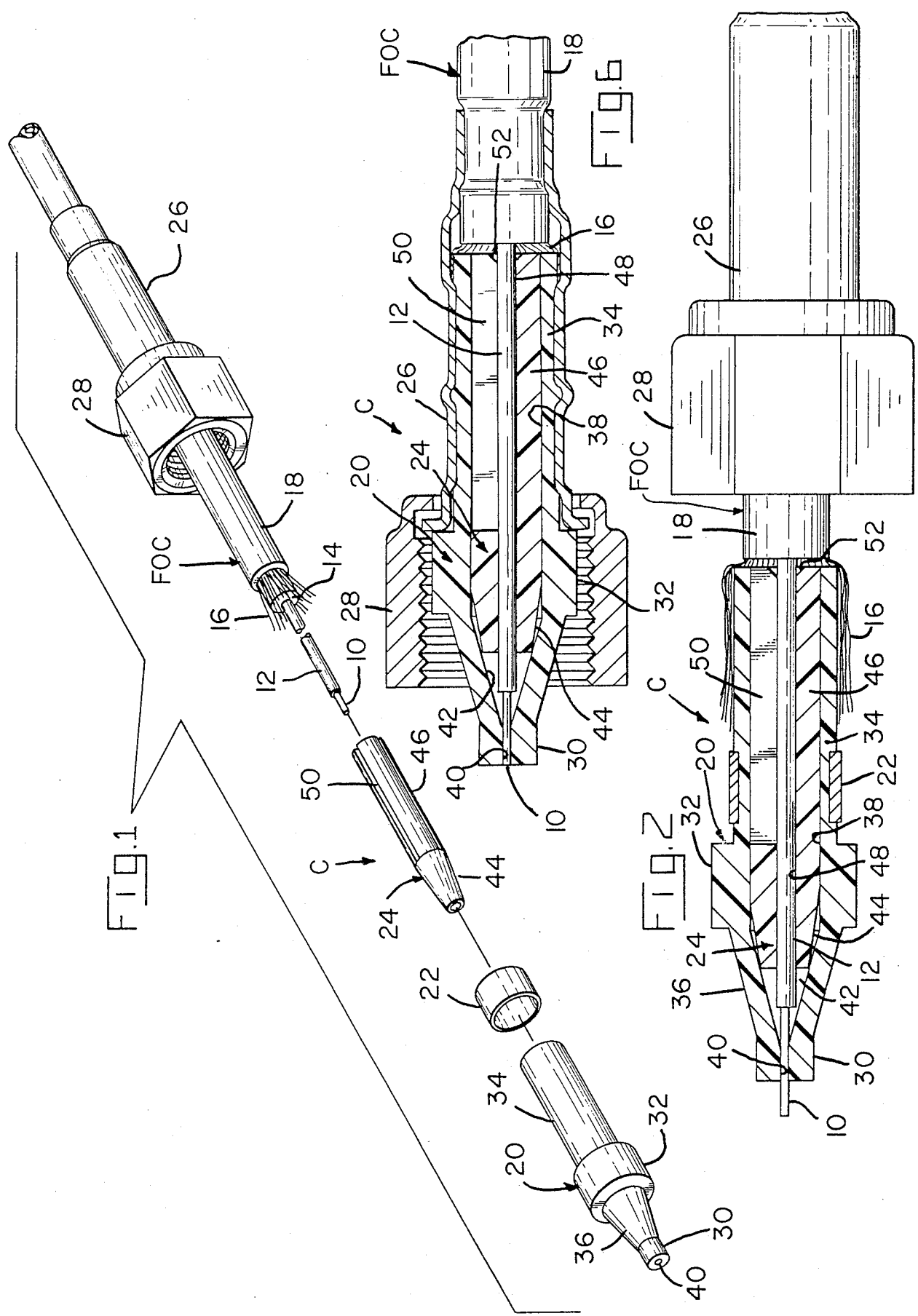

CONNECTOR FOR FIBER OPTIC MEMBER

FIELD OF THE INVENTION

This invention relates to a connector for a fiber optic member and includes an insert surrounding buffer material adjacent an exposed end of the fiber optic member and is positioned within a ferrule opening with arcuate sections of the insert being moved into engagement with the buffer material when a crimping ring on the ferrule is crimped thereon.

BACKGROUND OF THE INVENTION

U.S. Pat. No. 3,999,837 discloses a connector for a fiber optic member which includes a ferrule in which the fiber optic member and protective jacket thereon is disposed with an exposed end of the fiber optic member extending along a front bore. Potting material is applied onto the exposed fiber optic member before or after the fiber optic member is inserted into the ferrule. The potting material begins to cure thereby partly retaining the fiber optic member in the ferrule while the crimping ring is crimped onto the ferrule which holds the parts in place while the potting material fully cures.

The use of potting material secures the fiber optic member in the ferrule, but it is messy, it is an extra step, and it takes time the cure. This is undesirable when terminations of fiber optic members need to be done at remote locations in the field and they need to be done quickly and easily.

According to the present invention, a connector for a fiber optic member comprises a ferrule in which is positioned an insert surrounding a section of the fiber optic member adjacent an exposed end of the fiber optic member, the exposed end extending along a foot bore of the ferrule. A crimping ring on the ferrule is controllably crimped thereon thereby moving arcuate sections of the insert into mechanical engagement with the fiber optic member with no or minimum deformation to the fiber optic member and securing the fiber optic member in the ferrule.

According to another aspect of the present invention, the fiber optic member with buffer material thereover can be encased in an inner jacket having woven fibers covering the inner jacket and an outer jacket thereover which constitutes a fiber optic cable for use in telecommunications. An outer crimping member is then used to crimp the woven fibers onto the ferrule adjacent the crimping ring and to crimp onto the outer jacket to terminate the fiber optic cable for joining ends of such cable together or for connecting the cable to a light-transmitting or sensing member.

According to a further aspect of the present invention, a method of applying a connector to an end of a fiber optic member comprises the steps of placing an insert having arcuate sections onto the fiber optic member, inserting this assembly into a ferrule and controllably crimping a crimping ring on the ferrule thereby moving the arcuate sections into engagement with the fiber optic member thereby securing the fiber optic member to the ferrule.

BRIEF DESCRIPTION OF THE DRAWINGS

FIG. 1 is a perspective exploded view of the connector and the fiber optic cable.

FIG. 2 is a cross-sectional view of FIG. 1 showing a connector partly crimped onto the fiber optic cable.

FIG. 6 is a cross-sectional view similar to FIG. 3 showing the use of a single crimping ferrule.

DETAILED DESCRIPTION OF THE PREFERRED EMBODIMENT

Figure 3:
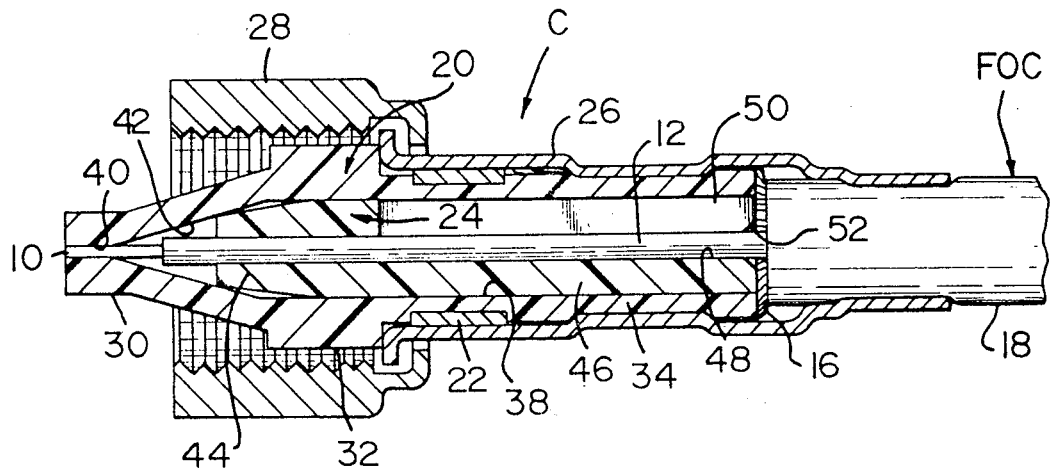
FIG. 3 is a view similar to FIG. 2 showing the connector completely crimped onto the fiber optic cable.

FIGS. 1 through 3 illustrate a connector C for terminating a fiber optic cable FOC. The fiber optic cable FOC includes a fiber optic member 10 which includes a core or light-transmitting member surrounded by cladding material to enable light to be transmitted therealong. Buffer material 12 covers fiber optic member 10 and is typically in the form of a plastic material to protect the fiber optic member. An inner jacket 14 also of plastic material surrounds buffer material 12 and lends strength to the cable to prevent the core or light-transmitting member from being broken since it can be made from glass or plastic material. Woven fibers 16 of plastic material surround inner jacket 14 to lend further strength to the cable and provides tensile strength thereto. An outer jacket 18 protects the entire cable assembly. The fiber optic cable FOC is stripped as illustrated in FIG. 2 to expose a length of woven fiber 16, buffer material 12, and fiber optic member 10 to enable the stripped fiber optic cable to be terminated onto connector C.

Connector C includes a ferrule member 20, a metal crimping ring 22, an insert 24, a crimping ferrule 26 on which is captured a threaded nut 28.

Ferrule 20 is made from a suitable plastic material having resilient characteristics and preferably fabricated by molding. It has a front cylindrical section 30, a central cylindrical section 32, and a rear cylindrical section 34, each of the cylindrical sections having a different diameter as can be discerned. A conical section 36 extends between sections 30 and 32. A rear bore 38 extends through sections 32 and 34. A front bore 40 extends through front cylindrical section 30 and has a diameter to receive fiber optic member 10 therethrough, whereas rear bore 38 has a diameter to receive insert 24 therein. Conical section 36 has an internal conical surface 42 extending between bores 38 and 40.

Insert 24 is molded from a suitable plastic material and includes a conical section 44 and a cylindrical section 46. A bore 48 extends through insert 24 to accommodate buffer material 12 of the fiber optic cable FOC. Slots 50 are located in cylindrical section 46 at 120° intervals therearound and they communicate with bore 48 thereby forming cylindrical section 46 into arcuate-engaging members. Slots 50 can be at right angles thereby forming four arcuate-engaging members. More slots can be provided thereby forming more than four arcuate-engaging members.

To terminate fiber optic cable FOC by a connector C, the fiber optic cable is stripped as illustrated in FIG. 2 to expose woven fibers 16, buffer material 12, and fiber optic member 10. A beveled surface 52 is located in cylindrical section 46 at the entrance to bore 48 to facilitate the positioning of buffer material 12 within bore 48 of insert 24 until buffer material extends slightly outward from conical section 44 and fiber optic member 10 also extends outwardly therefrom as shown in FIG. 2.

With crimping ferrule 26 and threaded nut 28 thereon positioned on the stripped fiber optic cable FOC, insert 24 with the bared buffer material 12 and fiber optic member 10 exposed in position therein is moved along rear bore 38 in ferrule 20 until conical section 44 engages conical surface 42 and fiber optic member 10 extends outwardly from the front end of cylindrical section 30. Crimping ring 22 is then reduced in diameter by a crimping tool (not shown) thereby causing reduction of cylindrical section 34 under crimping ring 22 and the movement of the arcuate sections of cylindrical section 46 into engagement with buffer material 12 thereby securing buffer material and fiber optic member 10 in position in ferrule 20. If the light transmission member of the fiber optic member is glass, it is scribed and broken at the front surface of section 30. This causes the end of fiber optic member 10 to extend slightly beyond the surface of section 30. Ferrule 20 is rotated 90° and crimping ring 22 is crimped again by the crimping tool which forms crimping ring 22 into a circular configuration which subjects ferrule 20 to a slight elongation which moves the front surface of section 30 into coincidence with the scribed and broken surface of the fiber optic member 10.

Woven fibers 16 are then positioned along cylindrical section 34 as illustrated in FIG. 2 whereafter crimping the ferrule with threaded nut 28 thereon is moved along woven fibers 16 and cylindrical section 34 until crimping ferrule 26 engages cylindrical section 32. The crimping ferrule 26 engages cylindrical section 32. The crimping tool then reduces crimping ferrule 26 in the area overlying woven fibers 16 which also reduces cylindrical section 34 and moves other areas of the arcuate sections of cylindrical section 46 into engagement with buffer material 12 thereby providing an additional crimping area by ferrule member 20 with insert member 24 and insert 24 with buffer material 12, which results in a redundant crimping. The securing of woven fibers 16 between crimping ferrule 26 and ferrule 20 provides strain relief. Crimping ferrule 26 is lastly reduced in diameter along an area overlying fiber optic cable FOC thereby completely securing crimping ferrule in position and providing strain relief to the termination.

If the light transmission member of fiber optic member 10 is formed of plastic material, the fiber optic member 10 extending beyond cylindrical section 30 after crimping ring 22 has been crimped in one direction it is subjected to a hot knife cut in accordance with conventional practice thereby providing a surface at right angles to the axis of fiber optic member 10. After fiber optic member 10 has been cut by the hot knife, fiber optic member 10 extends very slightly beyond the front surface of cylindrical section 30. Ferrule 20 is then rotated 90° and crimping ring 22 is crimped by the crimping tool again to form crimping ring 22 into a circular configuration which subjects ferrule 20 to a slight elongation which moves the front surface of cylindrical section 30 into coincidence with the cut surface of fiber optic member 10. Thereafter crimping ferrule 26 is moved into position along strength member 16 and cylindrical section 34 and crimping ferrule 26 is crimped at its two locations along ferrule member 20 and outer jacket 18 of the fiber optic cable FOC thereby securing connector C in position on fiber optic cable FOC thereby resulting in a proper and complete termination of the fiber optic cable.

Figure 4:
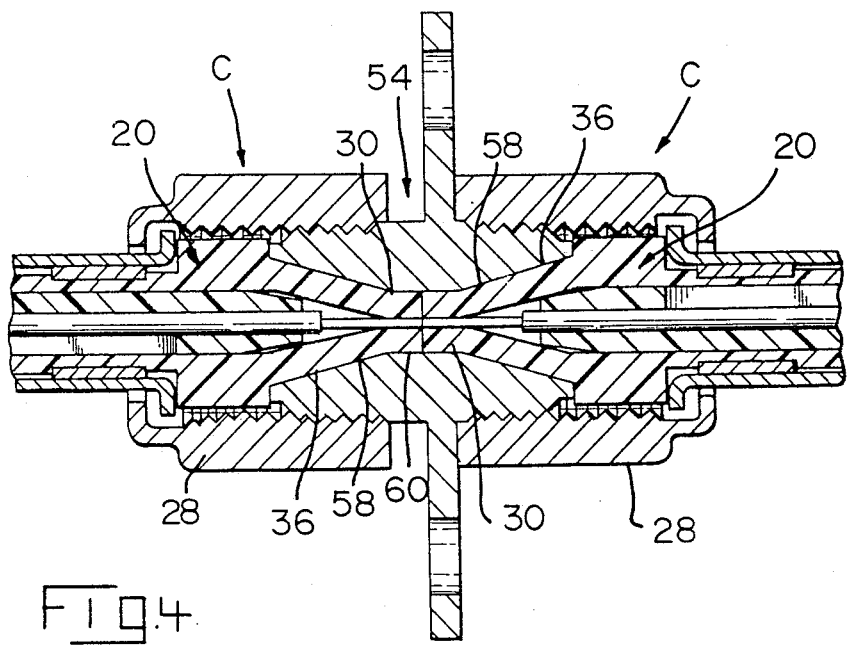
FIG. 4 is a cross-sectional view of a splice connector for fiber optic cables.

After ends of the fiber optic cable have been terminated by connector C, the connectors can be secured onto a coupling bushing 54 as shown in FIG. 4. The bore of coupling bushing 54 has identical conical bores 58 leading to a central cylindrical surface 60. When threaded nuts 28 of connector C threadably engage coupling bushing 54, surface 58 engages conical section 36 of ferrules 20 to radially compress these sections of the ferrules 20 thereby causing resilient radial deformation thereof which biases the fiber optic member to a stable position within central cylindrical surface 60 which will align fiber optic members 10 therein. The radial compression of two similar resilient ferrules within a commonly shaped surface 60 will bias corresponding light-transmitting members or cores 10 into coincident alignment even though the cladding layers over the light transmission members or cores are of different diameter.

Figure 5:
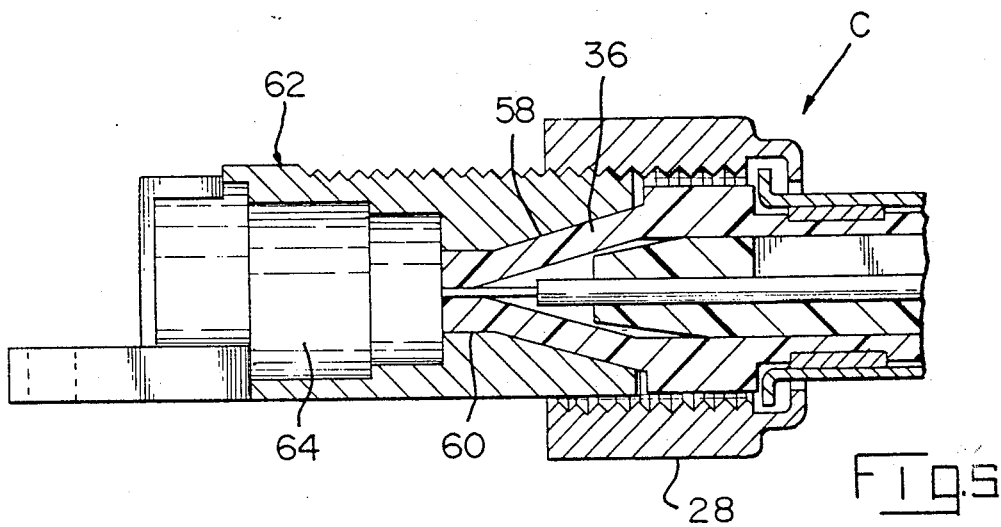
FIG. 5 is a cross-sectional view of a connection of a fiber optic cable to a light-transmitting or sensing member.

FIG. 5 shows a fixture 62 that is to be mounted onto a printed circuit board and a light-transmitting or light-sensing member (not shown) can be mounted within cavity 64. Connector C of a terminated fiber optic cable is then threadably secured onto fixture 62 which has a bore 60 and conical bore 58 of the same configuration as coupling bushing 54 to properly align the fiber optic member of the fiber cable with the light-transmitting or light-sensing member positioned in cavity 64. Connector C can also be connected to the optic adapter junction disclosed in U.S. Pat. No. 4,186,996 as illustrated in FIGS. 5 and 6 thereof.

As an alternative as shown in FIG. 6, crimping ferrule 26 can be used as a single crimping member which is first controllably crimped onto cylindrical section 32 thereby moving forward areas of the arcuate sections of insert 24 into engagement with buffer material 12; then crimping ferrule 26 is controllably crimped onto fibers 16 and section 32 thereby moving rear areas of arcuate sections of insert 24 into engagement with buffer material 12 and finally crimping ferrule 26 is controllably crimped onto outer jacket 18 of the cable FOC. When the final crimping operation has been performed, the fiber optic member 10 is scribed and broken or hot knife cut at the front surface of section 30, whereafter ferrule 26 is rotated 90° and controllably crimped again at the first crimped location thereby causing ferrule 20 to slightly elongate and move the front surface of section 30 coincident with the scribed and broken or cut surface of the fiber optic member.

We claim:

1. A connector for terminating a fiber optic member having a buffer material thereon comprising a ferrule having an opening extending therethrough including front and rear bores interconnected by a conical surface characterized in that:

an insert comprises a conical section and a cylindrical section, a hole through said conical section and said cylindrical section to enable the fiber optic member to be inserted therethrough with an end of the fiber optic member being exposed, said cylindrical section having a longitudinally extending slot communicating with said hole which forms arcuate members, said insert being positionable on the buffer material and being insertable along with the fiber optic member into said opening with said conical section engaging at least a part of said conical surface and with said cylindrical section extending along said rear bore, a crimping ring on said ferrule over said slot and adapted to be controllably crimped thereon to move said arcuate members thereunder into mechanical engagement with the buffer material to secure said fiber optic member within said ferrule with the exposed end of the fiber optic member disposed in the front bore.

2. A connector as set forth in claim 1 characterized in that said fiber optic member and buffer material is part of a fiber optic cable having strength members and an outer jacket, a crimping ferrule positioned along said ferrule and over said strength members and along said outer jacket and being controllably crimpable onto said ferrule in the area of said strength members to secure the strength members between the ferrule and crimping ferrule and onto said outer jacket to provide strain relief between said connector and said fiber optic cable.

3. A connector as set forth in claim 1 characterized in that the end surface of said fiber optic member is in the same plane as the front surface of said ferrule.

4. A connector as set forth in claim 1 characterized in that said ferrule comprises a front cylindrical section, a central cylindrical section, a rear cylindrical section and a conical section extending between said front and central cylindrical sections.

5. A connector for terminating a fiber optic means comprising:
   ferrule means having a front section and a rear section, said ferrule means having an opening extending therethrough including a front bore extending through said front section and a rear bore extending through said rear section;
   insert means having a hole extending therethrough and a longitudinally extending slot in communication with said hole for positioning a section of the fiber optic means along said hole, said insert means with the section of the fiber optic means in said hole being positionable in said rear bore with an end of the fiber optic means being disposed along said front bore; and
   crimping ring means on said rear section being controllably crimpable thereonto thereby reducing said rear section under said crimping ring means and moving the part of said insert means under said crimping ring means into securing engagement with the area of the fiber optic means thereunder thereby securing the fiber optic means in said ferrule means.

6. A connector as set forth in claim 5 wherein said crimping means comprises a crimping ring.

7. A connector as set forth in claim 5 further comprising crimping-ferrule means positionable along said rear section and controllably crimpable thereonto and onto strain means of said fiber optic means extending along said rear section, said crimping-ferrule means controllably crimpable onto an outer jacket of the fiber optic means.

8. A connector as set forth in claim 5 wherein said opening through said ferrule means includes a conical surface extending between said front and rear bores, said insert means having a front conical section engaging onto said conical surface when in position in said opening.

9. A connector as set forth in claim 5 wherein said insert means includes a rear cylindrical section having slot means in communication with said hole thereby forming arcuate members defining said part of said insert means that is moved into engagement with the fiber optic means.

10. A connector as set forth in claim 5 wherein the end of the fiber optic means is coincident with a front surface of said front section.

11. A connector as set forth in claim 5 wherein said ferrule means is resilient.

12. A method of terminating a connector onto an end of fiber optic means characterized by the steps of:
    placing a section of the fiber optic means adjacent the end of the fiber optic means into a hole of an insert member with the end of the fiber optic means extending outwardly therefrom, said insert member having a longitudinally extending slot in communication with said hole;
    inserting said insert member with the section of the fiber optic means therein into an opening of a ferrule member with the end of the fiber optic means disposed in a front section of said opening; and
    controllably crimping a crimping member on said ferrule member and over at least a portion of said insert member along said slot thereby reducing the ferrule member under said crimping member and moving the portion of said insert member thereunder into engagement with the section of the fiber optic means which secures the fiber optic means in said ferrule member.

13. A method as set forth in claim 12 characterized by the further step of positioning a crimping ferrule along strain members of the fiber optic means and along said ferrule member and said crimping member, and controllably crimping said crimping ferrule onto the strain members and said ferrule member thereby securing said crimping ferrule onto said ferrule member and the strain members therebetween.

14. A method as set forth in claim 13 characterized by the further step of controllably crimping said crimping ferrule onto an outer jacket of the fiber optic means.

15. A method as set forth in claim 14 characterized by the further step of scribing and breaking or hot knife cutting the end of the fiber optic means extending out from a front surface of said ferrule member at said front surface.

16. A method as set forth in claim 15 characterized by the further step of controllably crimping said crimping member at a crimping position normal to the original crimping position thereby elongating said ferrule member so that said front surface and the scribed and broken or cut surface of the fiber optic means are coincident.

17. A method as set forth in claim 12 characterized by the further step of scribing and breaking or hot knife cutting the end of the fiber optic means extending out from a front surface of said ferrule member at said front surface.

18. A method as set forth in claim 17 characterized by the further step of controllably crimping said crimping member at a crimping position normal to the original crimping position thereby elongating said ferrule member so that said front surface and the scribed and broken or cut surface of the fiber optic means are coincident.

19. A method as set forth in claim 12 characterized by the further step of controllably crimping said crimping member onto strain members of the fiber optic means and onto said ferrule member thereby reducing the ferrule member thereunder and moving another portion of said insert member into engagement with another section of the fiber optic means.

20. A method as set forth in claim 19 characterized by the further step of controllably crimping said crimping member onto an outer jacket of the fiber optic means.

* * * * *